(12) United States Patent
Suzuki et al.

(10) Patent No.: US 7,344,156 B2
(45) Date of Patent: Mar. 18, 2008

(54) HARNESS SLACK TAKE-UP STRUCTURE FOR STEERING GEAR

(75) Inventors: Hitoshi Suzuki, Kitamoto (JP); Takashi Uchida, Tokorozawa (JP); Toshikazu Yoshihara, Kasukabe (JP)

(73) Assignee: Calsonic Kansei Corporation, Tokyo (JP)

( * ) Notice: Subject to any disclaimer, the term of this patent is extended or adjusted under 35 U.S.C. 154(b) by 16 days.

(21) Appl. No.: 10/759,210

(22) Filed: Jan. 20, 2004

(65) Prior Publication Data

US 2004/0145167 A1     Jul. 29, 2004

(30) Foreign Application Priority Data

Jan. 20, 2003    (JP)    ............................. 2003-010891

(51) Int. Cl.
*B62D 1/18* (2006.01)
*B60R 16/02* (2006.01)
*H02G 3/04* (2006.01)

(52) U.S. Cl. .................... 280/775; 74/493; 174/69; 174/72 A

(58) Field of Classification Search ................ 280/775; 74/493; 174/69, 72 A
See application file for complete search history.

(56) References Cited

U.S. PATENT DOCUMENTS

| 5,003,129 A | * | 3/1991 | Toyomasu et al. ............ 174/69 |
| 5,037,131 A | * | 8/1991 | Kuramoto et al. .......... 280/775 |
| 5,229,544 A | * | 7/1993 | Horiuchi et al. ........... 174/52.1 |
| 5,556,059 A | * | 9/1996 | Maeda et al. ................. 248/49 |
| 6,723,923 B2 | * | 4/2004 | Tsukamoto ................ 174/68.1 |

FOREIGN PATENT DOCUMENTS

| EP | 0 412 482 A1 | | 2/1991 |
| JP | 7-69141 A | | 3/1995 |
| JP | 2002-176724 A | | 6/2002 |
| JP | 2003-032869 | * | 1/2003 |
| JP | 2003-199234 | * | 7/2003 |

* cited by examiner

*Primary Examiner*—Paul N. Dickson
*Assistant Examiner*—George D. Spisich
(74) *Attorney, Agent, or Firm*—Foley & Lardner LLP

(57) ABSTRACT

A harness slack take-up structure for a steering gear enables a harness case to be compact and the harness to be a standard round harness. The harness slack take-up structure employs a movable part and a fixed part to restrict the movement of the slack of the harness somewhat and to take-up the slack, thereby minimizing the size of the harness case.

13 Claims, 10 Drawing Sheets

HARNESS SLACK TAKE-UP STRUCTURE FOR STEERING GEAR

BACKGROUND OF THE INVENTION

1. Field of the Invention

The present invention relates to a harness slack take-up structure applicable to a steering gear having a telescopic mechanism to move a steering shaft back and forth.

2. Description of Related Art

There is a vehicle provided with a steering gear having a telescopic mechanism that moves a steering shaft back and forth to adjust the position of a steering wheel. In such a steering gear, slack is provided for a harness that is connected to an electrical section of the steering wheel and is forwardly extended along the steering shaft The slack is taken up when the steering wheel is moved back and forth, so that the back-and-forth motion of the steering wheel may not affect the electrical parts to which the harness is connected.

To accommodate the slack of the harness, a case is arranged adjacent to a steering column in which the steering shaft is rotatable. The slack of the harness in the case is looped To prevent entanglement in the case, the harness must be a flat harness having a self-restoration capability. When the steering-wheel is moved forward to push the harness into the case, the diameter of the looped slack of the harness in the case enlarges to take up the pushed part of the harness. When the steering wheel is moved backward, the restoration force of the harness automatically sends the harness out of the case.

According to the related art mentioned above, a part of the harness must be looped to form a looped slack that is stored in the case. Relying on the natural take-up motion of the slack of the harness, the steering column is moved back and forth. To secure a smooth movement of the slack of the harness, the case must be large, but a large case narrows the space around the steering column.

SUMMARY OF THE INVENTION

To prevent entanglement of the harness in the case, the related art must employ a flat harness having a self-restoration capability. A flat harness is relatively expensive, and therefore, is disadvantageous in terms of cost.

In order to overcome the above problems, the present invention provides a harness slack take-up structure for a steering gear, capable of employing a compact case and a standard round harness.

A first aspect of the present invention provides a harness slack take-up structure for a steering gear, configured to take up a slack of a harness extended from a steering wheel. The harness slack take-up structure involves a steering shaft to which the steering wheel is fixed, a steering column rotatably accommodating the steering shaft and movable in a longitudinal direction together with the steering shaft the slack of the harness, the harness being forwardly extended along the steering column, a slack case to accommodate the slack of the harness, a movable part movable in the slack case and interlocked with the steering column to move in a front-rear direction, and a fixed part relatively fixed to the slack case. A first end of the slack of the harness is held by the movable part, and a second end of the slack of the harness is held by the fixed part.

A second aspect of the present invention provides the harness slack take-up structure of the first aspect with additional characteristics. Namely, the slack case is relatively fixed to the steering column, the movable part is a fixed shaft fixed to the slack case, and the fixed part is a movable shaft that is relatively fixed to a vehicle body and is movable relative to a long hole formed in the slack case. The fixed shaft is fixed at a position that is substantially the center of a moving range of the movable shaft.

A third aspect of the present invention provides the harness slack take-up structure of any one of the first and second aspects with additional characteristics. Namely, a second slack case is relatively fixed to the steering column. The second slack case has an inner cylinder to pass the steering shaft and an outer cylinder rotatably attached to the inner cylinder, to form a cylindrical hollow between the outer cylinder and the inner cylinder. A second slack of the harness is formed between the slack mentioned above and the steering wheel. The second slack has a length corresponding to a range in a rotational angle of the steering wheel. A first end of the second slack is held by the inner cylinder, and a second end of the second slack is held by the outer cylinder. The second slack is stored in the cylindrical hollow.

DETAILED DESCRIPTION OF EMBODIMENTS

Figure 1:
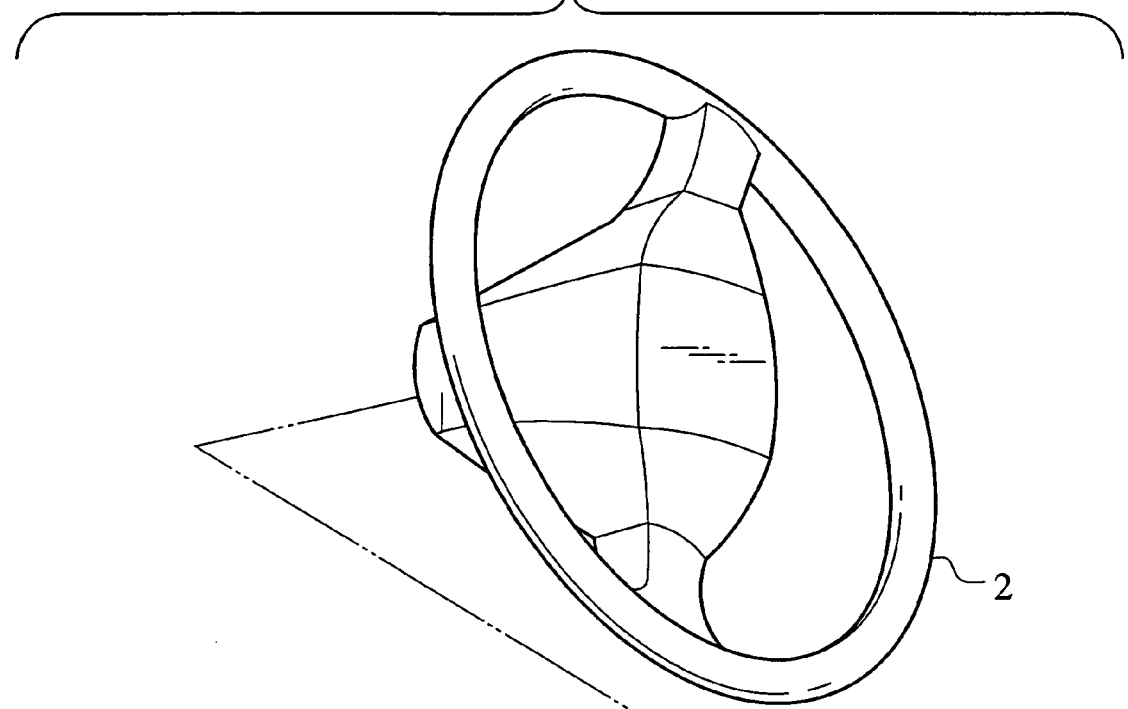
FIG. 1 is a partly exploded perspective view showing a steering gear according to a first embodiment of the present invention.
Figure 1:
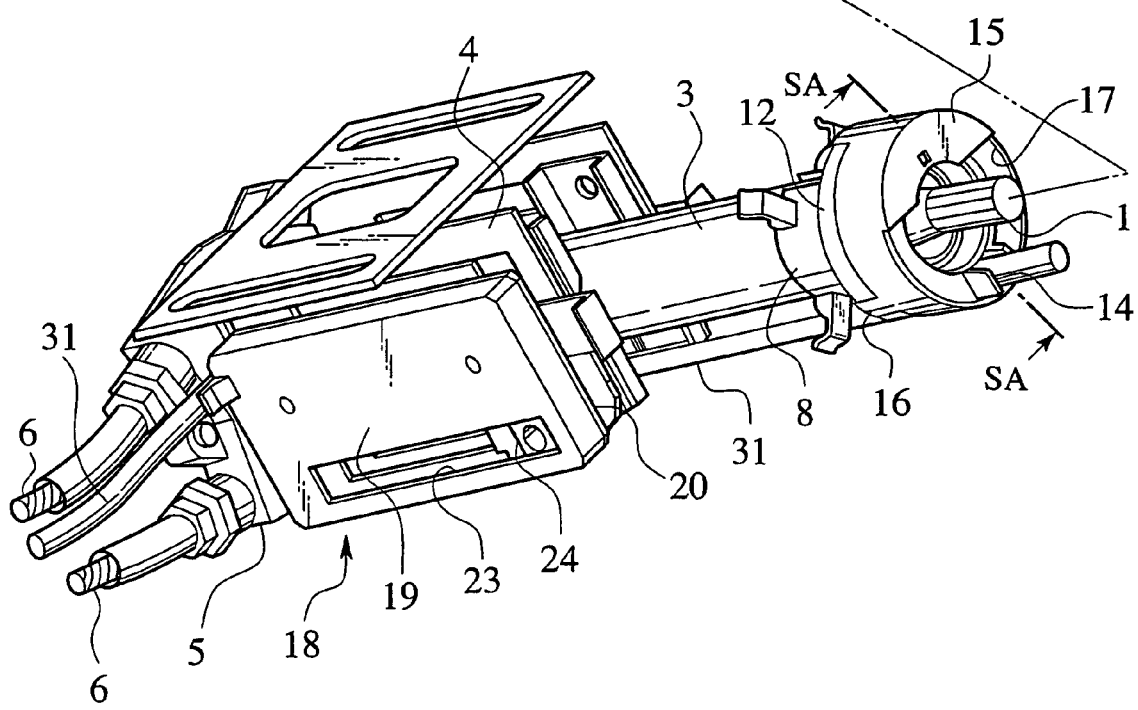
Figure 2:
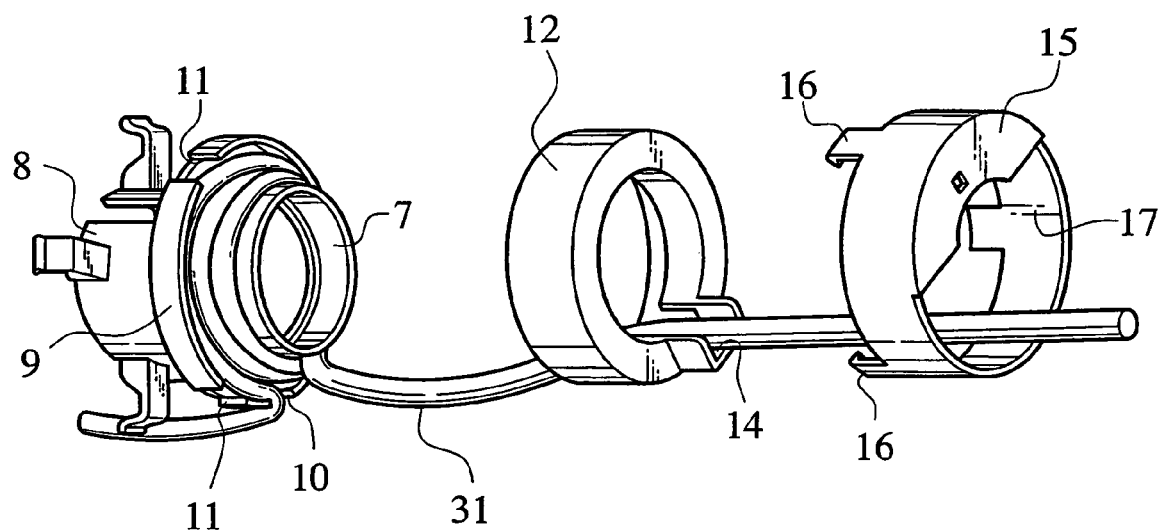
FIG. 2 is an exploded perspective view showing a harness slack take-up structure arranged at a rear end of a steering column shown in FIG. 1.
Figure 3:
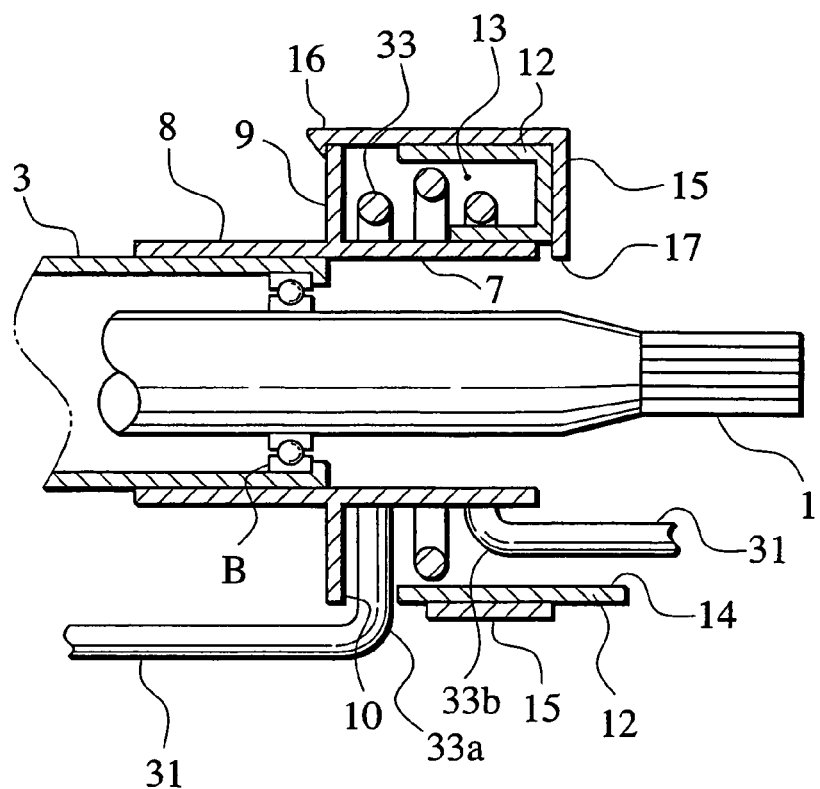
FIG. 3 is a sectional view taken along a line SA-SA of FIG. 1, showing the rear end of the steering column.
Figure 4:
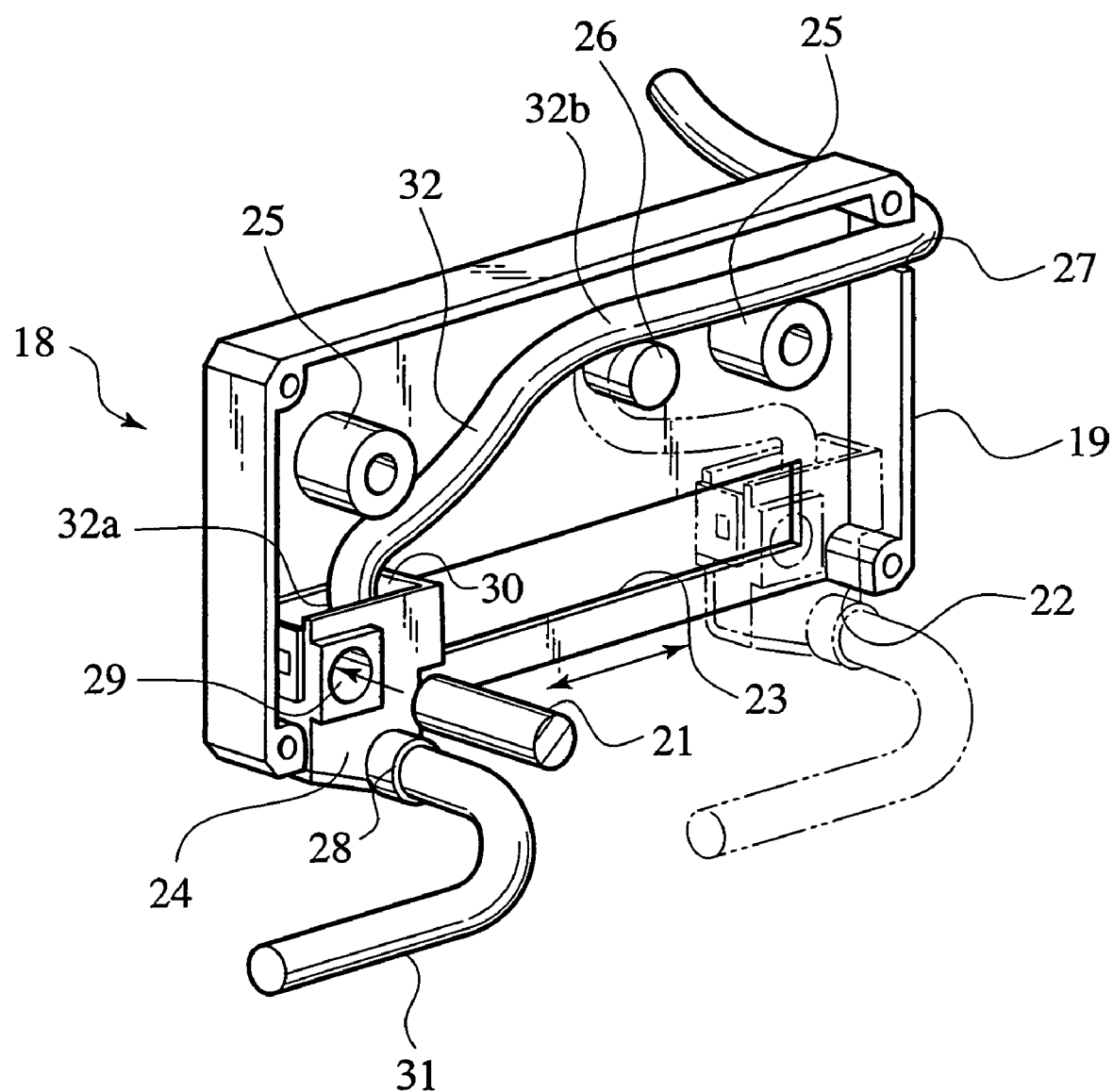
FIG. 4 is a perspective rear view showing the inside of a case shown in FIG. 1.

A harness slack take-up structure for a steering gear according to the first embodiment of the present invention will be explained with reference to FIGS. 1 to 5. A steering shaft 1 has, at a rear end thereof, a steering wheel 2 to rotate the steering shaft 1.

The steering shaft 1 is oriented in a front-rear direction and is upwardly inclined so that the rear end thereof faces a driver. In this specification, the "front-rear direction" is an extending direction of the steering shaft 1.

The steering shaft 1 is received in a cylindrical steering column 3 and is supported with bearings B. The steering shaft 1 is passed through the steering column 3 and is rotatable therein. The steering column 3 is not rotatable. The steering column 3 and the steering shaft 1 contained therein are together supported so as to be movable in the front-rear direction relative to a bracket 4 fixed to a vehicle body.

In response to a rotational operation of the steering wheel 2, the steering shaft 1 rotates by a given angle in a clockwise or counterclockwise direction, and the rotation is transmitted to a gear box 5 attached to a front end of the steering column 3. The gear box 5 has two wound wires 6 that extend vertically. The wires 6 are alternately pulled and pushed to transmit the rotation of the steering wheel 2 to a steering mechanism.

A cap is fixed to the rear end of the steering column 3. The cap 8 serves as a second slack holder and has an inner cylinder 7 through which the steering shaft 1 passes. The cap 8 has an L-shape flange 9 whose diameter is greater than the diameter of the inner cylinder 7. A lower end of the flange 9 is provided with a narrow outlet 10. In addition to the outlet 10, the flange 9 has three cuts 11.

An outer cylinder 12 is fitted to the inner cylinder 7 of the cap 8. The outer cylinder 12 is substantially annular and has a U-shape section having a front opening. A front-rear length of the outer cylinder 12 is shorter than that of the inner cylinder 7. When the outer cylinder 12 is fitted to the inner cylinder 7, a gap is left between the front end of the outer cylinder 12 and the flange 9, so that the outlet 10 is not closed by the outer cylinder 12.

The inner cylinder 7 and outer cylinder 12 form a cylindrical hollow 13 (FIG. 3) around the steering column 3, to receive the slack of the harness. From the rear end of the outer cylinder 12, an inlet 14 for the cylindrical hollow 13 protrudes.

The rear end of the outer cylinder 12 is covered with a cover 15. The cover 15 has three hooks 16. The hooks 16 engage with the thee cuts 11 formed in the flange 9 of the cap 8. The cover 15 prevents the outer cylinder 12 from dropping. The outer cylinder 12 is rotatable between the cap 8 and the cover 15. The cover 15 has a semicircular opening 17 to allow the movement of the inlet 14 protruding from the outer cylinder 12.

The bracket 4 supports the steering column 3 such that the steering column 3 is movable in the front-rear direction. On the left side of the bracket 4, a case (slack holder) 18 is fixed to receive a slack 32 of the harness. The case 18 consists of a box-like case body 19 whose right side is open and a lid 20 that covers the case body 19.

The lid 20 has a long hole (not shown) extending in the front-rear direction. The steering column 3 has a pin 21 (FIG. 4) that is relatively fixed to the steering column 3 and is movable in the front-rear direction. The pin 21 is movably inserted in the long hole (not shown) formed in the lid 20, and a front end of the pin 21 protrudes into the inside of the case 18.

The case body 19 has an inlet 22. The inlet 22 is open at a lower part of the case body 19 along the whole length of the case body 19. The surface of the case body 19 in the vicinity of the inlet 22 has a guide hole 23 extending in the front-rear direction. The guide hole 23 supports a movable part 24 that slides in the front-rear direction along the guide hole 23 at the inlet 22.

Upper part of the case body 19 has two bosses 25 that pass through the lid 20 and are fitted to the bracket 4. Between the bosses 25, the case body 19 has a columnar fixed part 26 that is fixed slightly forward of the center of the distance between the bosses 25. A top end of a front end face of the case body 19 has a narrow outlet 27.

The movable part 24 has a box structure having a top opening. A lower part of the movable part 24 has a cylindrical inlet 28. The movable part 24 contains a cylindrical effector 29 that is located slightly rearward of the inlet 28. The effector 29 receives the pin 21 of the steering column 3 that passes through the long hole (not shown) of the lid 20, so that the movable part 24 may move with the steering column 3 in the front-rear direction. Above the effector 29, there is a round pusher 30. The pusher 30 is located slightly forward of the effector 29 and has a curved face.

The harness 31 is connected to electrical parts such as a horn and an air bag provided for the steering wheel 2. The harness 31 is a standard one having a circular section (not flat). The harness 31 extended from the steering wheel 2 is inserted into the cylindrical hollow 13 through the inlet 14 of the outer cylinder 12. The harness 31 in the cylindrical hollow 13 is wound around the inner cylinder 7, to secure a slack to cover a maximum rotation quantity of the steering wheel 2, i.e. a range in a rotational angle of the steering wheel 2. Then, the harness 31 is pulled out of the outlet 10 of the cap 8 along the steering column 3. A length of the harness 31 between a part 33b thereof at the inlet 14 and a part 33a thereof at the outlet 10 is the second slack 33, and the cylindrical hollow 13 serves as a second slack holder to contain the second slack 33.

The harness 31 pulled out of the outlet 10 of the cap 8 is laid along the steering column 3 toward the front end of the steering column 3, is passed under the bracket 4, and is inserted into the inlet 22 of the case 18. The inlet 22 of the case 18 has the movable part 24 that moves in the front-rear direction. The harness 31 is inserted into the movable part 24 through the inlet 28, is windingly passed between the effector 29 and the pusher 30, and is pulled up from the top of the movable part 24.

The harness 31 winds and curves in the movable part 24. Due to this, the harness 31 is held by the movable part 24 and will not be detached from the movable part 24 even if it is pulled or pushed. The effector 29 and pusher 30 that are in contact with the harness 31 have round faces so as not to damage the surface of the harness 31.

The harness 31 taken out of the top of the movable part 24 is laid along the fixed part 26. More precisely, the slack 32 of the harness 31 is rounded from the back side toward the front side of the fixed part 26. Then, the harness 31 is pulled out of the case 18 through the outlet 27 of the case body 19. Thereafter, the harness 31 is connected to an electrical controller. The fixed part 26 that is in contact with the harness 31 has a round surface so as not to damage the surface of the harness 31.

Between the movable part 24 and the fixed part 26, the harness 31 has the slack 32. When the steering column 3 is moved in the front-rear direction, the slack 32 takes up the movement, and therefore, the remaining part of the harness 31 is immobile. The slack 32 includes a first part 32a that winds in the movable part 24 and a second part 32b that is laid along the fixed part 26. The slack 32 is movable in the front-rear direction with the second part 32b serving as a fulcrum. The fixed part 26 is fixed slightly forward of the center of the distance between the bosses 25 in consideration of the thickness of the harness 31, and therefore, the second part 32b of the slack 32 that is laid from the rear side of the fixed part 26 is substantially positioned at the center of a moving range (the length of the guide hole 23) of the first part 32a held by the movable part 24.

Operation of the embodiment will be explained. With the telescopic mechanism, the steering column 3 and the steering shaft 1 inside the steering column 3 are moved together in the front-rear (longitudinal) direction. Namely, the steering column 3 is moved in the front-rear direction relative to the case 18 fixed to the bracket 4 that is fixed to the vehicle body. In response to this, the movable part 24 engaging with the pin 21 of the steering column 3 moves in the front-rear direction, and the first part 32a of the slack 32 held in the movable part 24 swings-in the front-rear direction with the second part 32b placed on the fixed part 26 serving as a fulcrum.

Only the slack 32 of the harness 31 moves in the front-rear direction, and the harness 31 after the fixed part 26 is immobile. Namely, the harness 31 exiting from the outlet 27 of the case 18 is not affected by the movement Since the second part 32b of the slack 32 is at the center of the moving range of the first part 32a, the slack 32 symmetrically swings in the front-rear direction. This results in minimizing the length of the slack 32.

In this way, the first embodiment employs the movable part 24 and fixed part 26 to restrict the movement of the slack 32 of the harness 31 to some extent, unlike the related art that allows the slack to freely move. This configuration of the first embodiment can minimize the size of the case 18 to make the case 18 compact and secure a sufficient space around the steering column 3 for easy installation of other equipment The first embodiment allows the harness 31 to be a standard round harness which is more advantageous in terms of cost than flat harnesses employed by the related arts.

Figure 5:
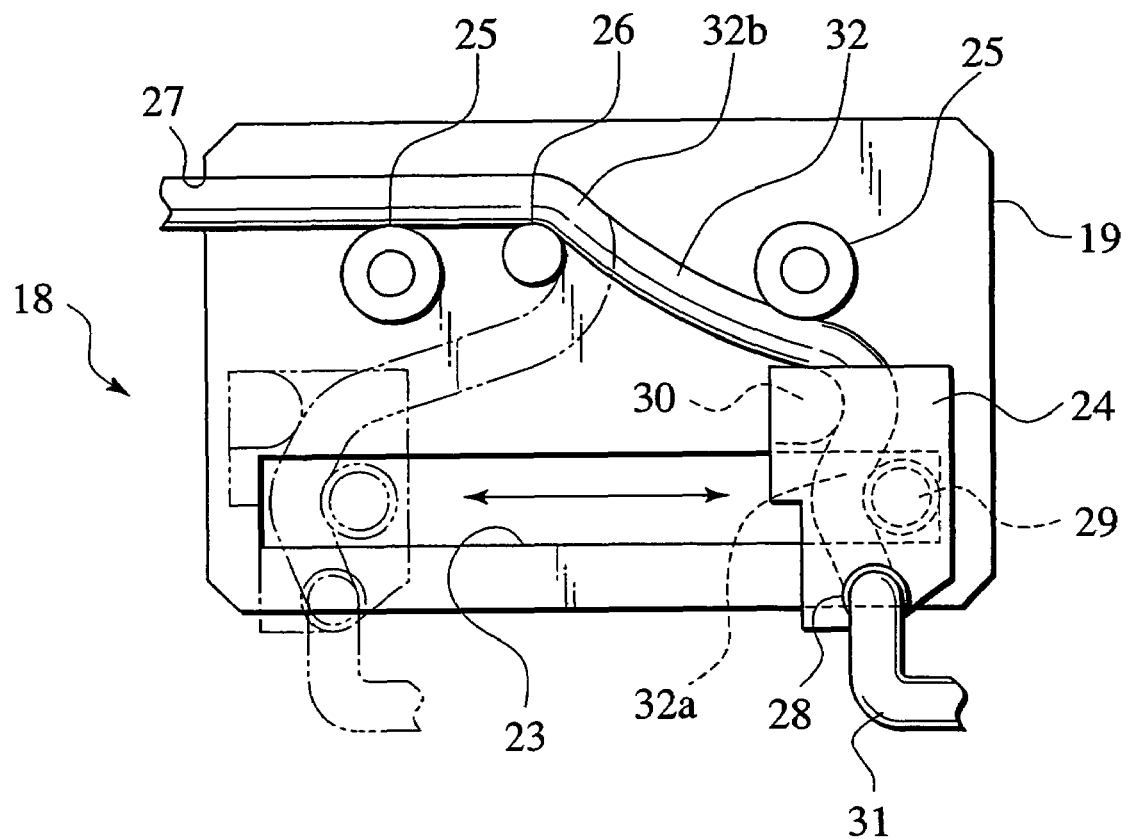
FIG. 5 is a front view showing the inside of the case shown in FIG. 4.
Figure 6:
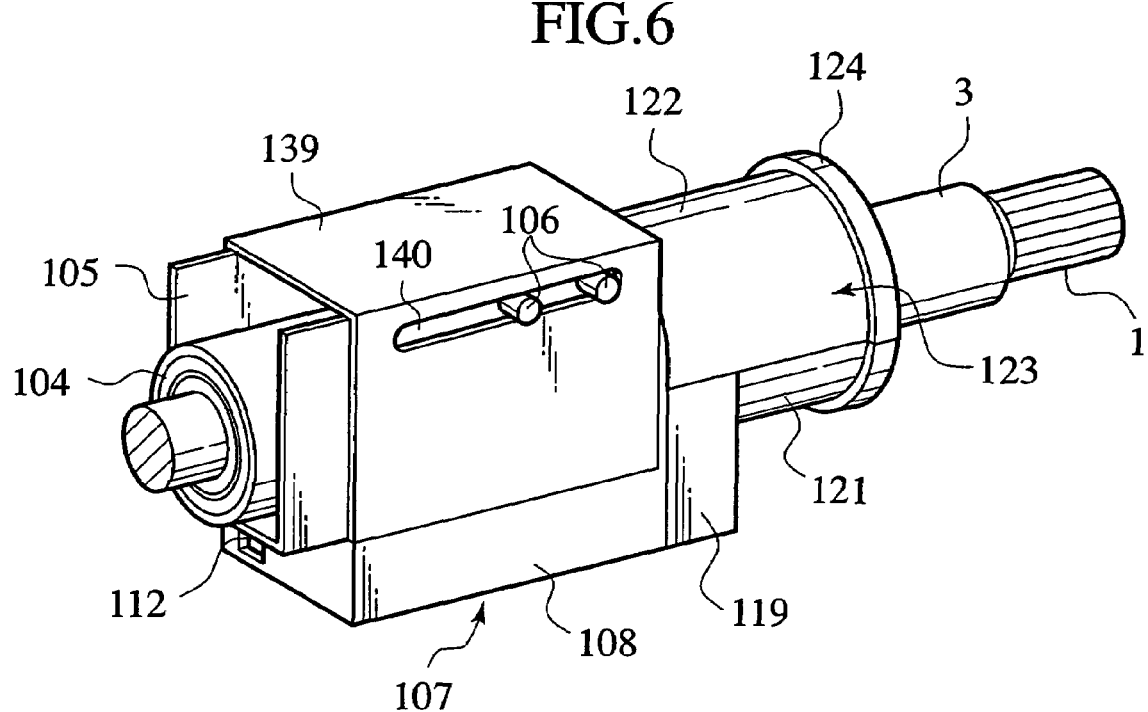
FIG. 6 is a perspective view showing a peripheral structure around a steering column of a steering gear according to a second embodiment of the present invention.
Figure 7:
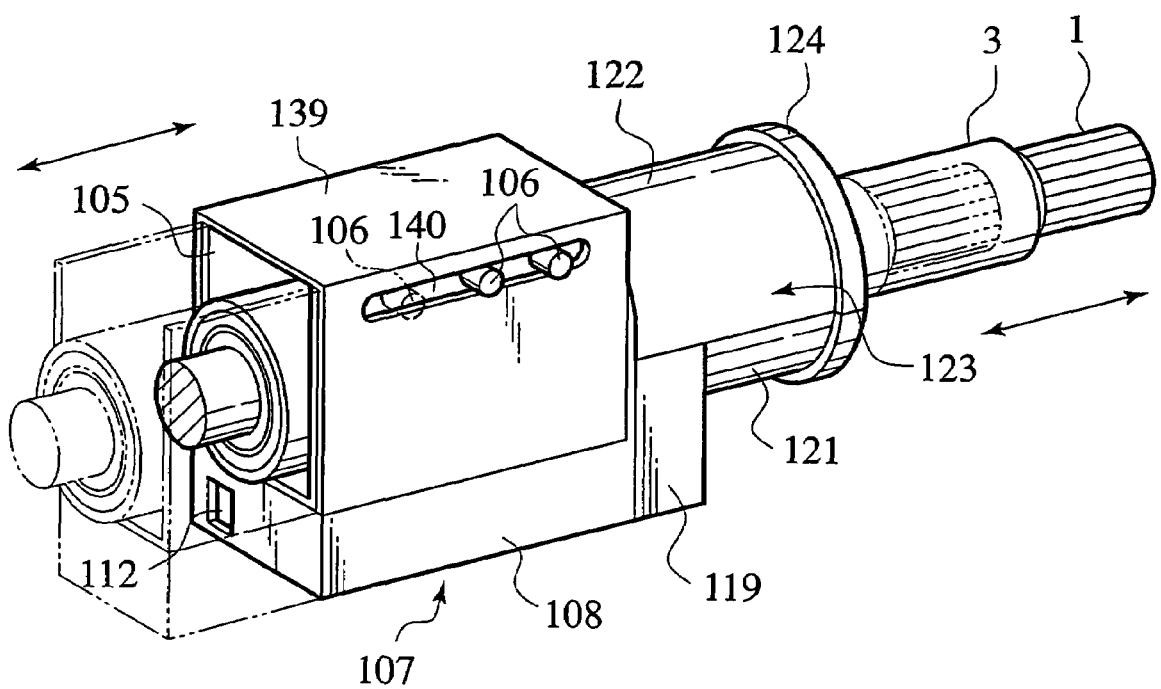
FIG. 7 is a perspective view corresponding to FIG. 6, showing the steering column at front and rear positions.
Figure 8:
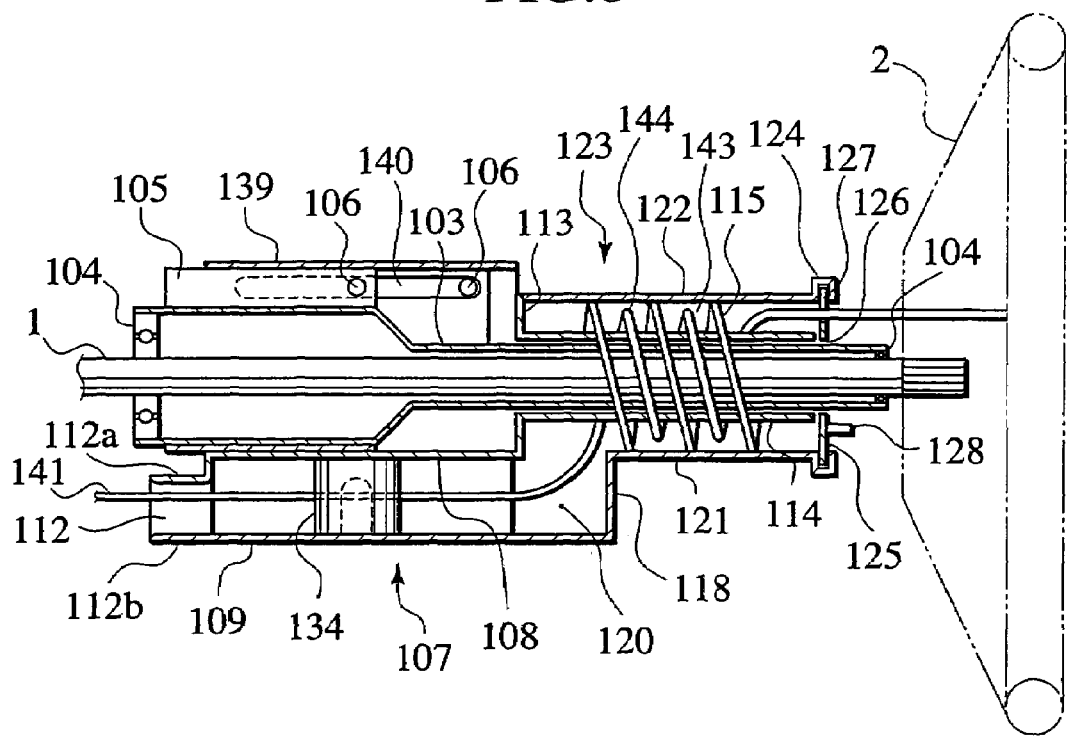
FIG. 8 is a sectional view showing the peripheral structure around the steering column of FIG. 6.
Figure 9:
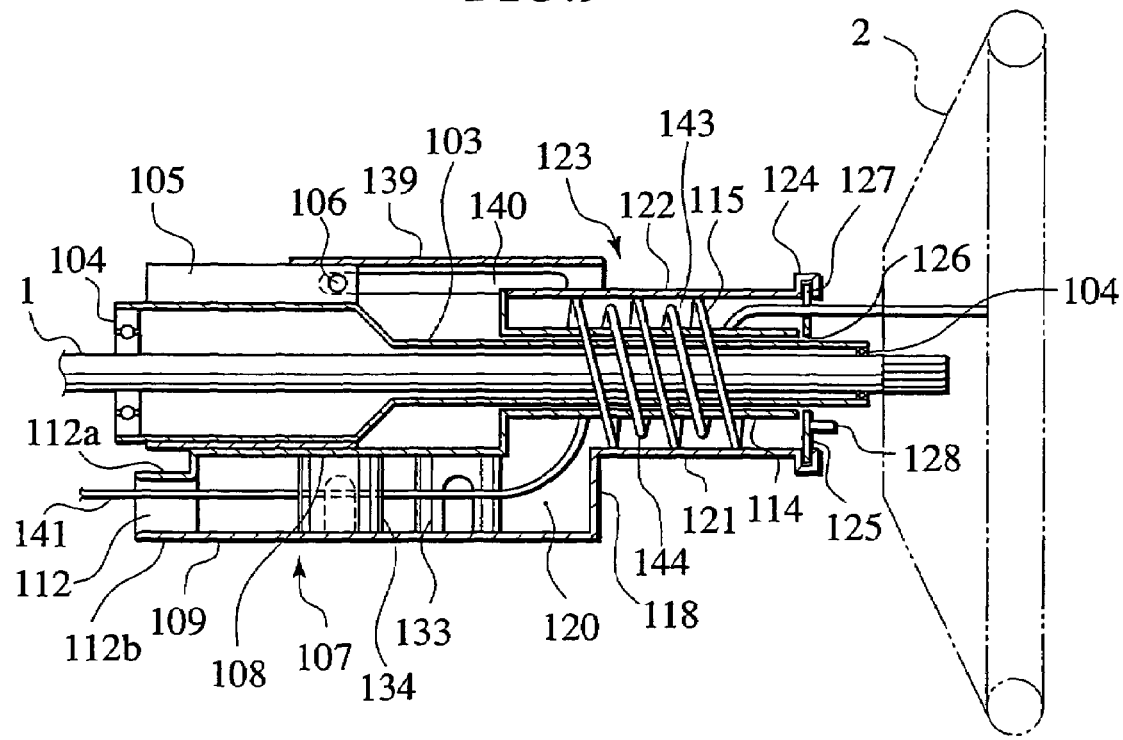
FIG. 9 is a sectional view corresponding to FIG. 8, showing the steering column at the front position.
Figure 10:
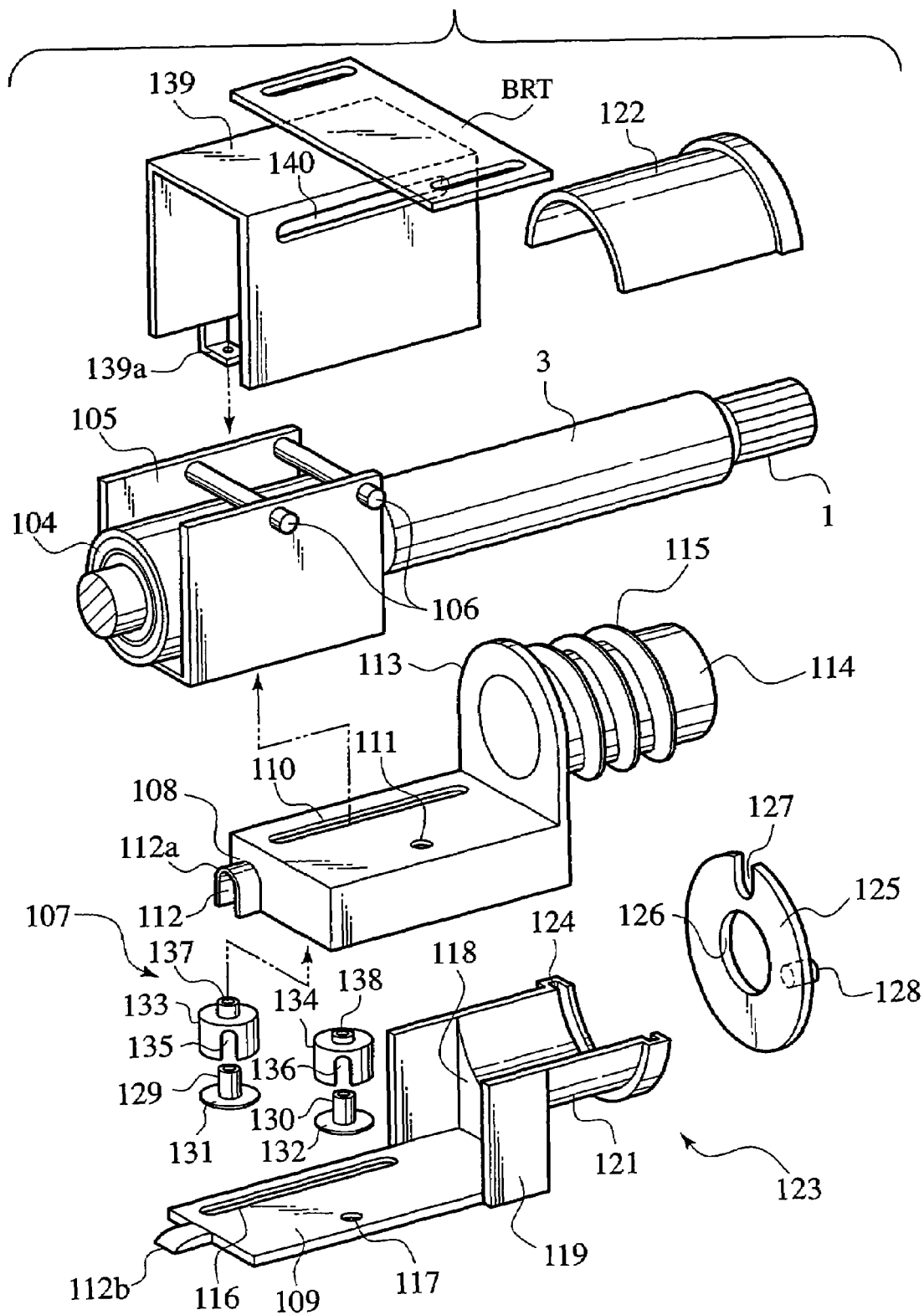
FIG. 10 is an exploded perspective view showing the steering column and a case shown in FIG. 6.
Figure 11:
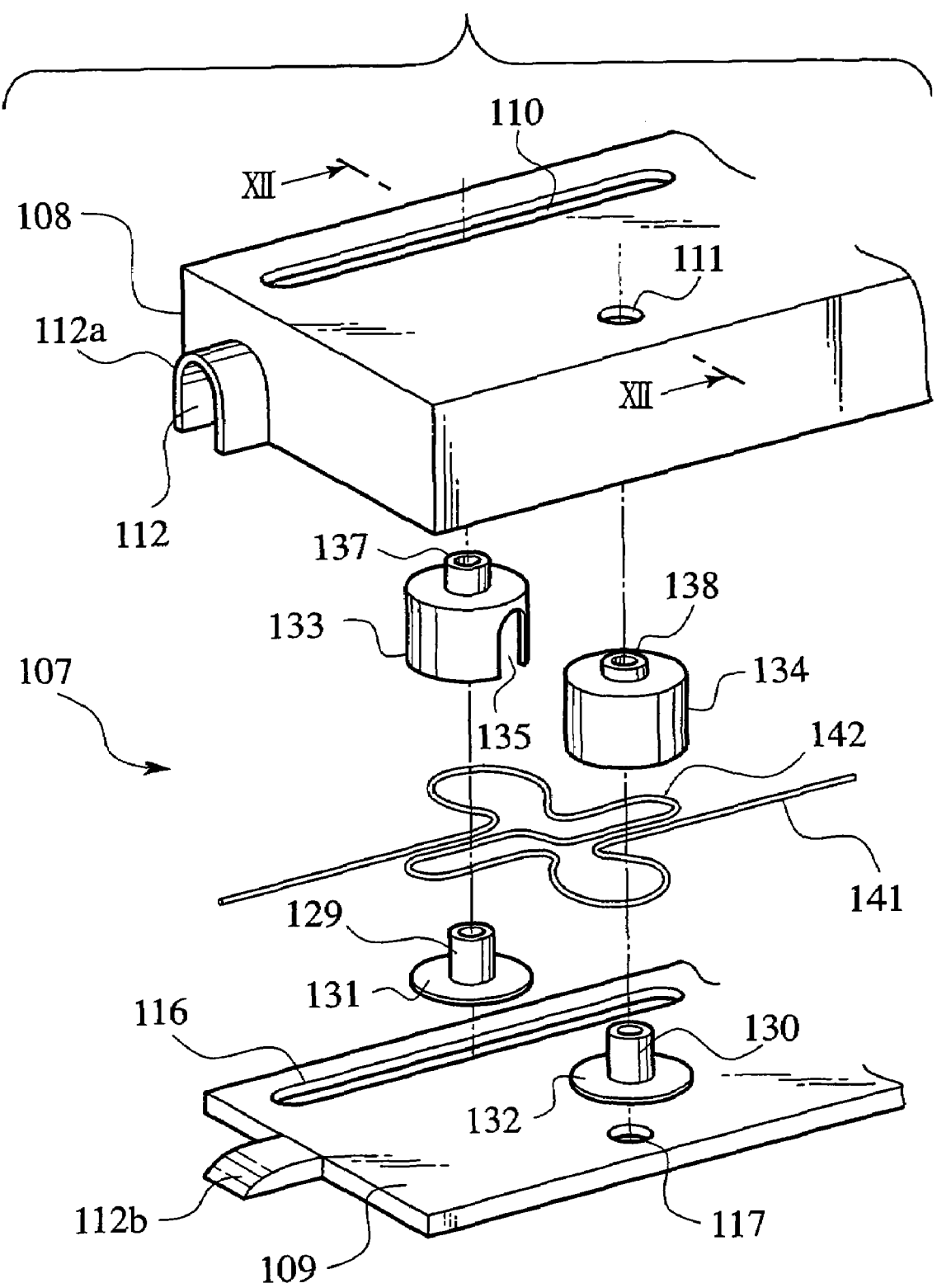
FIG. 11 is an exploded perspective view showing the inside of the case shown in FIG. 10.
Figure 12:
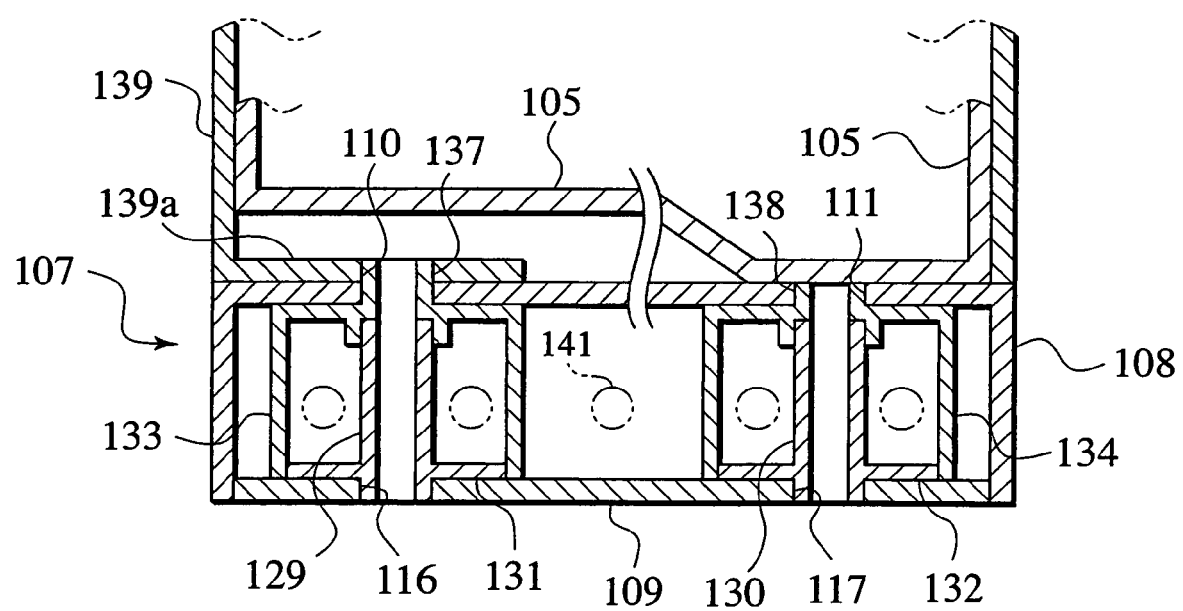
FIG. 12 is a sectional view taken along a line XII-XII of FIG. 11, showing the case in an attached state.
Figure 13:
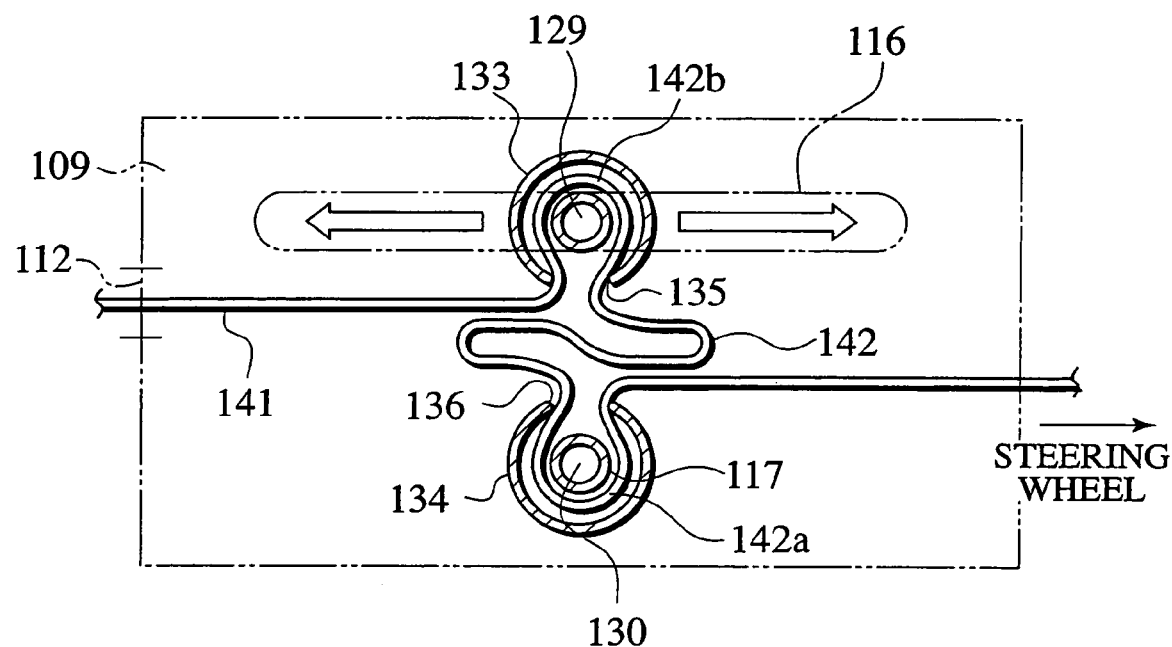
FIG. 13 is a sectional top view showing a movable shaft and a fixed shaft shown in FIG. 11.

As shown in FIG. 5, the fixed part 26 always has an unimpeded line of sight to at least a portion of the movable part 24. Further, the cylindrical effector 29 of the movable part 24 and the fixed part 26 always have the harness slack 32 therebetween. As a result, the slack 32 of the harness 31 never tangles or wears due to friction.

The harness 31 wound in the cylindrical hollow 13 secures the slack 33 to absorb a maximum rotation quantity of the steering wheel 2. Namely, a lengthwise change in the harness 31 in a rotational direction of the steering wheel 2 is taken up by the slack 33 of the harness 31 that winds and unwinds in the cylindrical hollow 13.

Second Embodiment

A harness slack take-up structure for a steering gear according to the second embodiment of the present invention will be explained with reference to FIGS. 6 to 14. A steering shaft 1 has, at a rear end thereof, a steering wheel 2 to rotate the steering shaft 1.

The steering shaft 1 is supported with a pair of front and rear bearings 104 in a cylindrical steering column 3. The steering shaft 1 is passed through the steering column 3 and is rotatable therein. The diameter of the steering column 3 is larger at a front part thereof than at a rear part thereof. The steering column 3 is supported by a vehicle body in such a way that it is not rotatable and is movable together with the steering shaft 1 in the front-rear direction.

The front part of the steering column 3 is fixed to a holder 105 having a U-shape section opened upwardly. A pair of pins 106 is passed through an upper rear part of the holder 105 in which both ends of the pins 106 protrude from the holder 105.

The holder 105 fixed to the steering column 3 is attached to an upper part of a case 107 with proper means. The case 107 is a slack holder to accommodate a slack 142 of a harness 141. The case 107 consists of a box-like case body 108 having open bottom and back and a base 109 serving as the bottom of the case body 108.

A top face of the case body 108 has a long hole 110 as a slot extending in the front-rear direction and a small hole 111. The position of the small hole 111 corresponds to the lengthwise center of the long hole 110. A front face of the case body 108 has an outlet 112 at a position corresponding to the long hole 110.

A vertical wall 113 rises from a rear end of the case body 108. From the vertical wall 113, an inner cylinder 114 is extended in the rearward direction. The inside of the inner cylinder 114 is a through hollow extending in the front-rear direction. The surface of the inner cylinder 114 is provided with a spiral plate 115 serving as a guide to spirally guide the harness 141.

The base 109 has a long hole 116 extending in the front-rear direction and a small hole 117. The long hole 116 and small hole 117 positionally correspond to the long hole 110 and small hole 111. A vertical wall 118 rises from a rear end of the base 109. The vertical wall 118 is on the back side of the vertical wall 113 of the case body 108. The vertical wall 118 has left and right side walls 119, to form a connection path 120 that is continuous with an inner space of the case 107.

From a top end of the vertical wall 118 of the base 109, a lower outer cylinder 121 having a semicircular section extends in the rearward direction. When the base 109 is attached to a lower part of the case body 108, the lower outer cylinder 121 gets in contact with peaks of the spiral plate 115.

The top of the spiral plate 115 is covered with an upper outer cylinder 122, which is joined with the lower outer cylinder 121. The upper outer cylinder 122 also gets in contact with the peaks of the spiral plate 115. The inner cylinder 114, lower outer cylinder 121, and upper outer cylinder 122 form a double cylinder 123. The inside of the double cylinder 123 defines a spiral space partitioned with the spiral plate 115. The spiral space is connected to the inner space of the case 107 through the connection path 120.

At a rear end of each of the lower outer cylinder 121 and upper outer cylinder 122, a groove 124 is formed. In the groove 124, a circular lid 125 is rotatably arranged. The center of the rotary lid 125 has a circular hole 126 to pass the steering column 3. In the hole 126, the steering column 3 is movable in the front-rear direction. An outer edge of the rotary lid 125 has a cut 127. The rotary lid 125 has a protrusion 128 extending in the rear direction. The protrusion 128 engages with a link mechanism (not shown) formed on the steering wheel 2, so that the rotary lid 125 may rotate with the steering wheel 2.

The case 107 contains a movable shaft 129 and a fixed shaft 130. The movable shaft 129 and fixed shaft 130 have, at lower parts thereof, flanges 131 and 132, respectively. A lower end of the movable shaft 129 is movably inserted into the long hole 116. A lower end of the fixed shaft 130 is inserted into the small hole 117.

The movable shaft 129 and fixed shaft 130 are covered with caps 133 and 134, respectively. The caps 133 and 134 have each a cylindrical shape having a top face and are provided with cuts 135 and 136 on their side faces, respectively. The cap 133 on the movable shaft 129 has an upper shaft 137 that is long enough to pass through the long hole 110 and protrude upwardly. The cap 134 on the fixed shaft 130 has an upper shaft 138 that is short enough to be inserted in the small hole 111 and does not protrude from the top face of the case body 108.

The double cylinder 123 of the case 107 passes the rear end of the steering column 3 therethrough. The upper shaft 137 of the cap 133 on the movable shaft 129 protrudes from the top face of the case body 108 and is engaged with the bottom face of a flange 139a that is bent from a bottom edge of a cover 139. Accordingly, relative to the holder 105 and steering column 3, the cap 133 and movable shaft 129 are movable in the front-rear direction. In other words, the cap 133 and the movable shaft 129 are a movable part to be slid along the long hole 110.

The holder 105 is covered with the cover 139, which is fixed to the vehicle body, e.g., a steering member (not shown) through a bracket BRT. The pins 106 of the holder 105 are movable in the front-rear direction in a guide hole 140 formed in the cover 139. Namely, the movable shaft 129 that is movable in the case 107 in the front-rear direction serves as a fixed part that is immobile relative to the vehicle body. On the other hand, the fixed shaft 130 in the case 107 fixed to the steering column 3 serves as a movable part to be movable together with the steering column 3.

The harness 141 is connected to electronic equipment such as an air bag and a horn provided for the steering wheel 2. The harness 141 is extended from the steering wheel 2 in the frontward direction, is inserted into the cut 127 of the rotary lid 125, and guided into the double cylinder 123. The harness 141 is a standard round harness and can easily be inserted into the double cylinder 123 through the cut 127.

In the space partitioned with the spiral plate 115 in the double cylinder 123, a second slack 144 of the harness 141 is wound in a large spiral shape. At this time, the length of the slack 144 is set to cover a maximum rotation quantity of the steering wheel 2 which corresponds to a range in a rotational angle of the steering wheel 2.

The harness 141 is passed through the inside of the double cylinder 123 and connection path 120 and is inserted into the case 107. In the case 107, a slack 142 of the harness 141 is passed through the cut 136 of the cap 134 on the fixed shaft 130, is inserted into the cap 134, is wound around the fixed shaft 130, and is taken out from the cut 136. The harness 141 is not completely wound around the fixed shaft 130 so that the harness 141 may not cross itself around the fixed shaft 130.

The harness 141 taken out from the cut 136 of the cap 134 is provided with a sufficient margin, is passed through the cut 135 of the cap 133 on the movable shaft 129 facing the fixed shaft 130, is inserted into the cap 133, is wound around the movable shaft 129, and is taken out from the cut 135. Then, the harness 141 is taken out from the outlet 112 on the front face of the case body 108, is laid in the front direction, and is connected to an electric controller. In this way, the slack 142 of the harness 141 is laid around the movable part 129 and fixed part 130 in a four-leaved clover pattern drown with a single stroke. As a result, the fixed part 129 and movable part 130 always face each other with the harness (slack) between them, so that the harness never entangles or wears by friction.

The length of the harness 141 between the movable shaft 129 and the fixed shaft 130 is longer than a maximum distance between the movable shaft 129 at the front or rear end of the long hole 116 and the fixed shaft 130, so that no tension is applied to the harness 141 when the movable shaft 129 is furthest from the fixed shaft 130. The position of the fixed shaft 130 is at the center of the moving range of the movable shaft 129 (substantially equal to the length of the long hole 116), to minimize the length of the harness 141 between the movable shaft 129 and the fixed shaft 130.

The outlet 112 is surrounded by a tunnel hood 112a protruding from the front face of the case body 108 and a tongue 112b protruding from a front edge of the base 109. Ends and corners of the hood 112a and tongue 112b are rounded so as not to damage the harness 141.

Figure 14:
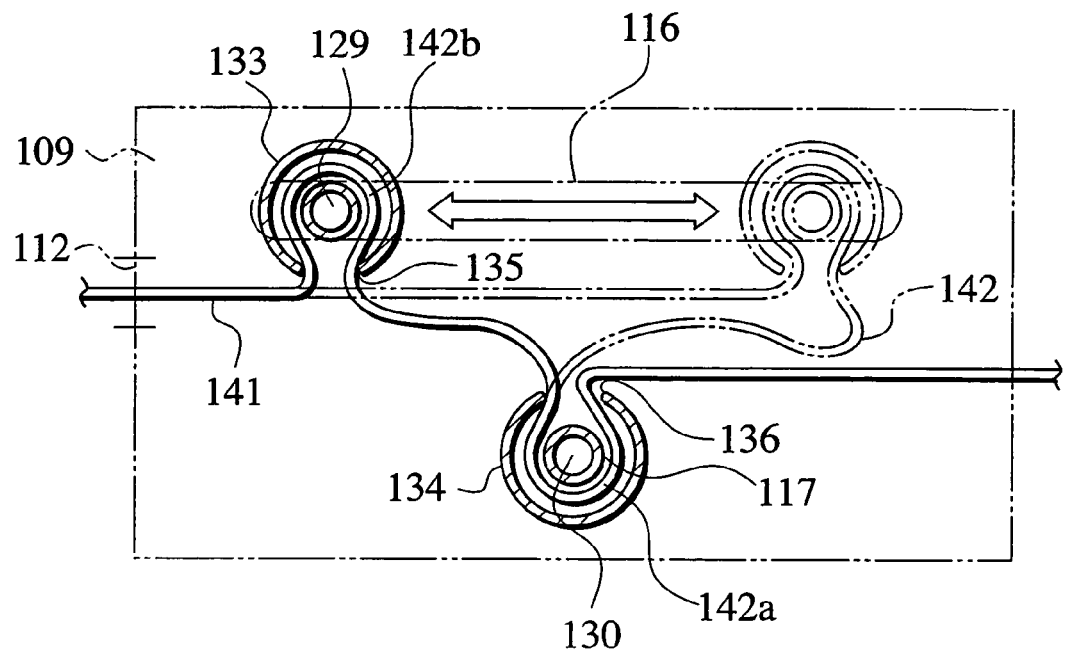
FIG. 14 is a sectional view corresponding to FIG. 11, showing the movable shaft at front and rear positions.

Operation of the second embodiment will be explained. With the telescopic mechanism, the steering column 3 and the steering shaft 1 inside the steering column 3 are moved together in the front-rear direction. Then, the holder 105 fixed to the steering column 3 moves in the front-rear direction relative to the case 107. As a result, the movable shaft 129 moves in the front-rear direction as shown in FIG. 14. At this time, the harness 141 between the movable shaft 129 and the fixed shaft 130 has a sufficient length longer than a maximum moving quantity of the movable shaft 129, i.e. a sliding range of the movable shaft 129. Accordingly, the movement never affects the extending of the harness 141 from the movable shaft 129 to the outside through the outlet 112.

In this way, this embodiment employs the movable shaft 129 and fixed shaft 130 to restrict the movement of the slack 142 of the harness 141 to some extent and absorb the movement This configuration minimizes the size of the case 107 and makes the case 107 compact The embodiment can secure a sufficient space around the steering column 3, for installation of other equipment The embodiment allows the harness 141 to be a standard round harness that is more advantageous in terms of cost than flat harnesses employed by the related arts.

The fixed part (129) and movable part (130) always face each other with the harness (slack) between them, and therefore, the harness 141 never entangles around the movable shaft 129 or the fixed shaft 130. The harness 141 never crosses itself around the movable shaft 129 or the fixed shaft 130. Even if the harness 141 swings for a long time due to vibration caused by the driving of the vehicle, the surface of the harness 141 never rubs or welds with itself. The harness 141 in the double cylinder 123 is prevented from contacting itself by the spiral plate 115, and therefore, never rubs or welds with itself.

The harness 141 in the double cylinder 123 has the slack 144 to cover the maximum rotation quantity of the steering wheel 2, so that a lengthwise change in the harness 141 due to the rotation of the steering wheel 2 can be taken up by the spirally wound slack 144 of the harness 141.

A cap nut may be set on the top face of the flange 139a, and a bolt may be passed from the bottom face of the base 109 through a through hole of the movable shaft 129. The bolt is fastened with the cap nut to surely fix the movable shaft 129 to the flange 139a.

Effects of the Present Invention

According to the present invention, the movable part and fixed part restrict the movement of the slack of a harness to some extent when taking up a lengthwise change of the harness. This configuration minimizes the size of a case for containing the harness. The harness may be a standard round harness which is advantageous in terms of cost.

Inside the case, a second part of the slack of the harness serves as a fulcrum for the movement of a first part of the slack. The second part is positioned substantially at the center of the moving range of the first part. As a result, the movement of the slack around the second part of the slack serving as a fulcrum becomes symmetrical in the front-rear direction. This configuration can minimize the length of the slack of the harness.

Only by zigzagging the first part of the slack of the harness in the case, the first part is held by the movable part.

A lengthwise change in the harness in a rotational direction of the steering wheel can be taken up by winding and unwinding a slack of the harness in a cylindrical hollow.

The fixed shaft is positioned substantially at the center of the moving range of the movable shaft, and therefore, the movement of the harness around the fixed shaft serving as a fulcrum becomes symmetrical in the front-rear direction. This configuration can minimize the length of the slack of the harness between the movable shaft and the fixed shaft.

The harness is not completely wound around the movable shaft or the fixed shaft, and therefore, the harness never crosses itself around the movable shaft or the fixed shaft. This prevents the surface of the harness from rubbing or welding with itself.

This application claims benefit of priority under 35USC §119 to Japanese Patent Applications No. 2003-010891, filed on Jan. 20, 2003, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A harness slack take-up structure for taking-up a slack of a harness extended from a steering wheel, comprising:
   a steering shaft to which the steering wheel is fixed;
   a steering column that is configured to rotatably accommodate the steering shaft and to slide together with the steering shaft in a front/rear direction;
   a bracket that supports the steering column slidably in the front/rear direction;
   a slack holder that is configured to contain the slack of the harness and fixed to the bracket;
   a movable part that is movable in the slack holder and connected to the steering column so as to slide with the steering column in the front/rear direction; and
   a fixed part that is fixed to the slack holder,
   wherein the harness extends along the steering column,
   wherein a first end of the slack is held by the movable part and a second end of the slack is held by the fixed part,
   wherein the fixed part has an unimpeded line of sight to at least a portion of the movable part when the movable part moves between an extreme frontward position and an extreme rearward position,
   wherein the fixed part and the movable part continuously have the slack of the harness therebetween when the movable part moves between the extreme frontward position and the extreme rearward position,
   wherein the second end of the slack is fixed at a position offset from a central portion of a moving range of the movable part,
   wherein the slack swings in the front/rear direction with the fixed part as a fulcrum, and
   wherein the slack extends substantially linearly when the movable part is positioned at the extreme frontward position or the extreme rearward position.

2. The harness slack take-up structure of claim 1, wherein the first end of the slack is zigzagged in the movable part.

3. The harness slack take-up structure of claim 2, further comprising:
   a second slack holder fixed relative to the steering column, having an inner cylinder through which the steering shaft is passed, an outer cylinder rotatably attached to the inner cylinder, and a cylindrical hollow formed between the inner cylinder and the outer cylinder; and
   a second slack of the harness formed between the slack of the harness and the steering wheel, the length of the second slack corresponding to a range in a rotational angle of the steering wheel, a first end of the second slack being held by the inner cylinder, a second end of the second slack being held by the outer cylinder, the second slack being stored in the cylindrical hollow.

4. The harness slack take-up structure of claim 1, further comprising:
   a second slack holder fixed relative to the steering column, having an inner cylinder through which the steering shaft is passed, an outer cylinder rotatably attached to the inner cylinder, and a cylindrical hollow formed between the inner cylinder and the outer cylinder; and
   a second slack of the harness formed between the slack of the harness and the steering wheel, the length of the second slack corresponding to a range in a rotational angle of the steering wheel, a first end of the second slack being held by the inner cylinder, a second end of the second slack being held by the outer cylinder, the second slack being stored in the cylindrical hollow.

5. The harness slack take-up structure of claim 4, wherein the inner cylinder has a guide to spirally guide the harness.

6. The harness slack take-up structure of claim 1, wherein the harness has a substantially circular cross-section.

7. The harness slack take-up structure of claim 1, wherein the movable part is connected to the steering column by a pin that moves in the front/rear direction within a long slot in the slack holder.

8. A harness slack take-up structure comprising:
   a harness;
   a steering shaft to engage a steering wheel;
   a steering column that is configured to rotatably accommodate the steering shaft and to slide together with the steering shaft in a front/rear direction;
   a bracket that supports the steering column slidably in the front/rear direction;
   a slack holder that is configured to contain a slack of the harness and fixed to the bracket;
   a movable part that is movable in the slack holder and connected to the steering column so as to slide with the steering column in the front/rear direction; and
   a fixed part that is fixed to the slack holder,
   wherein the harness extends alone the steering column and has a substantially round cross-section,
   wherein a first end of the slack is held by the movable part and a second end of the slack is held by the fixed part,
   wherein the fixed part and the movable part continuously have the slack of the harness therebetween when the movable part moves between an extreme frontward position and an extreme rearward position,
   wherein the second end of the slack is fixed at a position offset from a central portion of a moving range of the movable part,
   wherein the slack swings in the front/rear direction with the fixed part as a fulcrum, and
   wherein the slack extends substantially linearly when the movable part is positioned at the extreme frontward position or the extreme rearward position.

9. The harness slack take-up structure of claim 8, wherein the first end of the slack is zigzagged in the movable part.

10. The harness slack take-up structure of claim 8, wherein the movable part and the fixed part are arranged to always face each other with the slack between them.

11. The harness slack take-up structure of claim 8, further comprising:
   a second slack holder fixed relative to the steering column, having an inner cylinder through which the steering shaft is passed, an outer cylinder rotatably attached to the inner cylinder, and a cylindrical hollow formed between the inner cylinder and the outer cylinder; and
   a second slack of the harness formed between the slack of the harness and the steering wheel, the length of the second slack corresponding to a range in a rotational angle of the steering wheel, a first end of the second slack being held by the inner cylinder, a second end of the second slack being held by the outer cylinder, the second slack being stored in the cylindrical hollow.

12. The harness slack take-up structure of claim 8, wherein the fixed part has an unimpeded line of sight to at least a portion of the movable part when the movable part moves between the extreme frontward position and the extreme rearward position.

13. The harness slack take-up structure of claim 8, wherein the movable part is connected to the steering column by a pin that moves in the front/rear direction within a long slot in the slack holder.

* * * * *